United States Patent
Hashimoto et al.

(10) Patent No.: US 8,600,112 B2
(45) Date of Patent: Dec. 3, 2013

(54) CROSSWALK DETECTION DEVICE, CROSSWALK DETECTION METHOD AND RECORDING MEDIUM

(75) Inventors: Yoshikuni Hashimoto, Anjo (JP); Jun Adachi, Okazaki (JP); Masahiro Mizuno, Kiyosu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/583,868

(22) PCT Filed: Mar. 8, 2011

(86) PCT No.: PCT/JP2011/055384
§ 371 (c)(1),
(2), (4) Date: Sep. 10, 2012

(87) PCT Pub. No.: WO2011/114947
PCT Pub. Date: Sep. 22, 2011

(65) Prior Publication Data
US 2013/0016915 A1    Jan. 17, 2013

(30) Foreign Application Priority Data
Mar. 15, 2010   (JP) .................................. 2010-058286

(51) Int. Cl.
*G06K 9/00*    (2006.01)
(52) U.S. Cl.
USPC .......................................... 382/104; 382/199
(58) Field of Classification Search
USPC .................................................. 382/104, 199
See application file for complete search history.

(56) References Cited

U.S. PATENT DOCUMENTS

| | | | | |
|---|---|---|---|---|
| 4,214,265 A * | 7/1980 | Olesen | .......................... | 348/149 |
| 6,813,370 B1 | 11/2004 | Arai | | |
| 8,174,570 B2 * | 5/2012 | Yoneyama et al. | ........... | 348/135 |
| 8,184,859 B2 * | 5/2012 | Tanji | ............................. | 382/104 |
| 8,204,278 B2 * | 6/2012 | Edanami | ....................... | 382/104 |
| 2003/0072471 A1 * | 4/2003 | Otsuka et al. | ................. | 382/103 |
| 2004/0234124 A1 * | 11/2004 | Nakai et al. | ................... | 382/154 |

(Continued)

FOREIGN PATENT DOCUMENTS

| | | |
|---|---|---|
| JP | 8-315296 A | 11/1996 |
| JP | 2001-92970 A | 4/2001 |

(Continued)

OTHER PUBLICATIONS

International Search Report for PCT/JP2011/055384 dated Apr. 5, 2011.

*Primary Examiner* — Hadi Akhavannik
(74) *Attorney, Agent, or Firm* — Sughrue Mion, PLLC

(57) ABSTRACT

A crosswalk detection device executes a predetermined arithmetic processing on a calculated value calculated based on data obtained through a scanning operation using a main pattern. Next, the device determines whether or not a crosswalk is in a predetermined image based on a relationship between a calculated result of the arithmetic processing and a position of the main pattern MP on the predetermined image. The above-explained calculated value is, for example, an average of the brightness of pixels overlapping each sub pattern of the main pattern. Hence, even if a white pattern of the crosswalk is cracked or the white pattern has a separated part, the value of data is hardly affected. Accordingly, it is possible to precisely determine whether or not the crosswalk is in the predetermined image.

14 Claims, 10 Drawing Sheets

(56) References Cited

U.S. PATENT DOCUMENTS

| | | |
|---|---|---|
| 2007/0041614 A1 | 2/2007 | Tanji |
| 2007/0263902 A1 | 11/2007 | Higuchi et al. |
| 2008/0291276 A1* | 11/2008 | Randler ................. 348/149 |
| 2010/0121569 A1* | 5/2010 | Nakamura et al. ........... 701/208 |
| 2010/0329508 A1* | 12/2010 | Chen et al. ................ 382/103 |
| 2011/0216944 A1* | 9/2011 | Kawasaki et al. ............ 382/104 |

FOREIGN PATENT DOCUMENTS

| | | |
|---|---|---|
| JP | 2011-118509 A | 6/2001 |
| JP | 2004-310522 A | 11/2004 |
| JP | 2006-309313 A | 11/2006 |
| JP | 2007-52645 A | 3/2007 |
| JP | 2007-228448 A | 9/2007 |
| JP | 2007-264712 A | 10/2007 |

* cited by examiner

CROSSWALK DETECTION DEVICE, CROSSWALK DETECTION METHOD AND RECORDING MEDIUM

CROSS REFERENCE TO RELATED APPLICATIONS

This application is a National Stage of International Application No. PCT/JP2011/055384, filed on Mar. 8, 2011, which claims priority from Japanese Patent Application No. 2010-058286, filed on Mar. 15, 2010, the contents of all of which are incorporated herein by reference in their entirety.

TECHNICAL FIELD

The present invention relates to crosswalk detection device, crosswalk detection method, and recording medium, and more specifically, a crosswalk detection device that detects a crosswalk appearing in an image, crosswalk detection method for detecting a crosswalk in an image and a recording medium storing a program for detecting a crosswalk in an image.

BACKGROUND ART

The death toll due to traffic accidents is decreasing, but the number of occurrences of traffic accidents itself still remains at a high level. The cause of an occurrence of a traffic accident varies, but if the road condition where a vehicle is running can be grasped in advance, the occurrence of a traffic accident can be suppressed on some level.

Hence, various devices which obtain, in advance, information on a road where a vehicle is running are proposed (see, for example, Patent Literature 1). The device disclosed in Patent Literature 1 attempts to detect a crosswalk from an image obtained by imaging a road surface. Next, the device provides the detection result to a driver through a monitor. Hence, the driver who drives the vehicle can know in advance the presence/absence of the crosswalk that is present ahead in the night or in a severe weather condition, etc.

PRIOR ART LITERATURE

Patent Literature

Patent Literature 1: Unexamined Japanese Patent Application Kokai Publication No. 2006-309313

DISCLOSURE OF INVENTION

Problems to be Solved by the Invention

The above-explained device specifies a position which can be predicted as an outer border of the white pattern of a crosswalk based on a change in brightness of pixels configuring an image. Next, the device determines whether or not a crosswalk is in the image based on the regularity of the specified positions.

Accordingly, when some of the white pattern are separated due to aged deterioration, etc., and when a road having the white pattern formed thereon is cracked, etc., the regularity of a change in the brightness becomes obscure, which may result in the decrease of the detection precision of the crosswalk.

The present invention has been made in view of the above-explained circumstance, and it is an object of the present invention to detect a crosswalk precisely regardless of the condition of a road.

Means for Solving the Problems

To achieve the object, a crosswalk detection device according to a first aspect of the present invention includes: calculating means that calculates, while moving a main pattern including a first sub pattern corresponding to white patterns of a crosswalk appearing in an image and a second sub pattern corresponding to a region between the white patterns from a first position on the image to a second position different from the first position, a first calculated value calculated based on brightness of pixels overlapping the first sub pattern and a second calculated value calculated based on brightness of pixels overlapping the second sub pattern; computing means that performs arithmetic processing using the first calculated value and the second calculated value; and determining means that determines whether or not an image of the crosswalk is present between the first position and the second position based on a regularity of a relationship between a position of the main pattern and a process result by the computing means.

The computing means may obtain a difference between the first calculated value and the second calculated value.

The calculating means may calculate a value that is an index of a whole brightness of the first sub pattern as the first calculated value, and calculate a value that is an index of a whole brightness of the second sub pattern as the second calculated value.

The computing means may obtain a level of consistency between the first sub pattern and the white pattern in the image using the first calculated value and the second calculated value, and the determining means may determine whether or not the image of the crosswalk is present between the first position and the second position based on a regularity of a relationship between a position of the main pattern in a moving direction of the main pattern and the level of consistency that is a process result by the computing means.

The first position may be defined at a side of a traffic lane of a road appearing in the image, and the second position may be defined at another side of the traffic lane of the road appearing in the image.

The first position may be defined at a side of a road appearing in the image, and the second position may be defined at another side of the road appearing in the image.

The first position may be defined on a line defining a traffic lane of a road.

The main pattern may include the first sub pattern and the second sub pattern that adjoins to a side of the first sub pattern.

The main pattern may further include the another second sub pattern that adjoins to another side of the first sub pattern.

The determining means may determine whether or not the image of the crosswalk is present based on a regularity of an interval between peak values indicated by a characteristic curve derived from a process result by the computing means.

The determining means may determine whether or not the image of the crosswalk is present based on a regularity of an interval of peak values of a characteristic curve indicating a relationship between a position of the main pattern in a moving direction of the main pattern and a level of consistency that is a process result by the computing means.

A first straight line defined by the first position and the second position may be orthogonal to a road appearing in the image.

The calculating means may calculate, while further moving the main pattern along a second straight line parallel to the first straight line, a first calculated value calculated based on brightness of pixels overlapping the first sub pattern and a second calculated value calculated based on brightness of pixels overlapping the second sub pattern.

A crosswalk detection method according to a second aspect of the present invention includes: a calculating step for calculating, while moving a main pattern including a first sub pattern corresponding to white patterns of a crosswalk appearing in an image and a second sub pattern corresponding to a region between the white patterns from a first position on the image to a second position different from the first position, a first calculated value calculated based on brightness of pixels overlapping the first sub pattern and a second calculated value calculated based on brightness of pixels overlapping the second sub pattern; a computing step for performing arithmetic processing using the first calculated value and the second calculated value; and a determining step for determining whether or not an image of the crosswalk is present between the first position and the second position based on a regularity of a relationship between a position of the main pattern and a process result obtained based on the first calculated value and the second calculated value.

A program, according to a third aspect of the present invention, that allows a computer to function as: calculating means that calculates, while moving a main pattern including a first sub pattern corresponding to white patterns of a crosswalk appearing in an image and a second sub pattern corresponding to a region between the white patterns from a first position on the image to a second position different from the first position, a first calculated value calculated based on brightness of pixels overlapping the first sub pattern and a second calculated value calculated based on brightness of pixels overlapping the second sub pattern; computing means that performs arithmetic processing using the first calculated value and the second calculated value; and determining means that determines whether or not an image of the crosswalk is present between the first position and the second position based on a regularity of a relationship between a position of the main pattern and a process result by the computing means.

Effects of the Invention

According to the present invention, an arithmetic processing using the calculated value of the brightness of the plurality of pixels is executed. Next, based on the regularity of the relationship between the process result and the position of the main pattern, it is determined whether or not a crosswalk is in the image. Accordingly, even if a part of the white pattern is deteriorated, it is possible to precisely detect the crosswalk in the image.

MODE FOR CARRYING OUT THE INVENTION

<<First Embodiment>>

Figure 1:
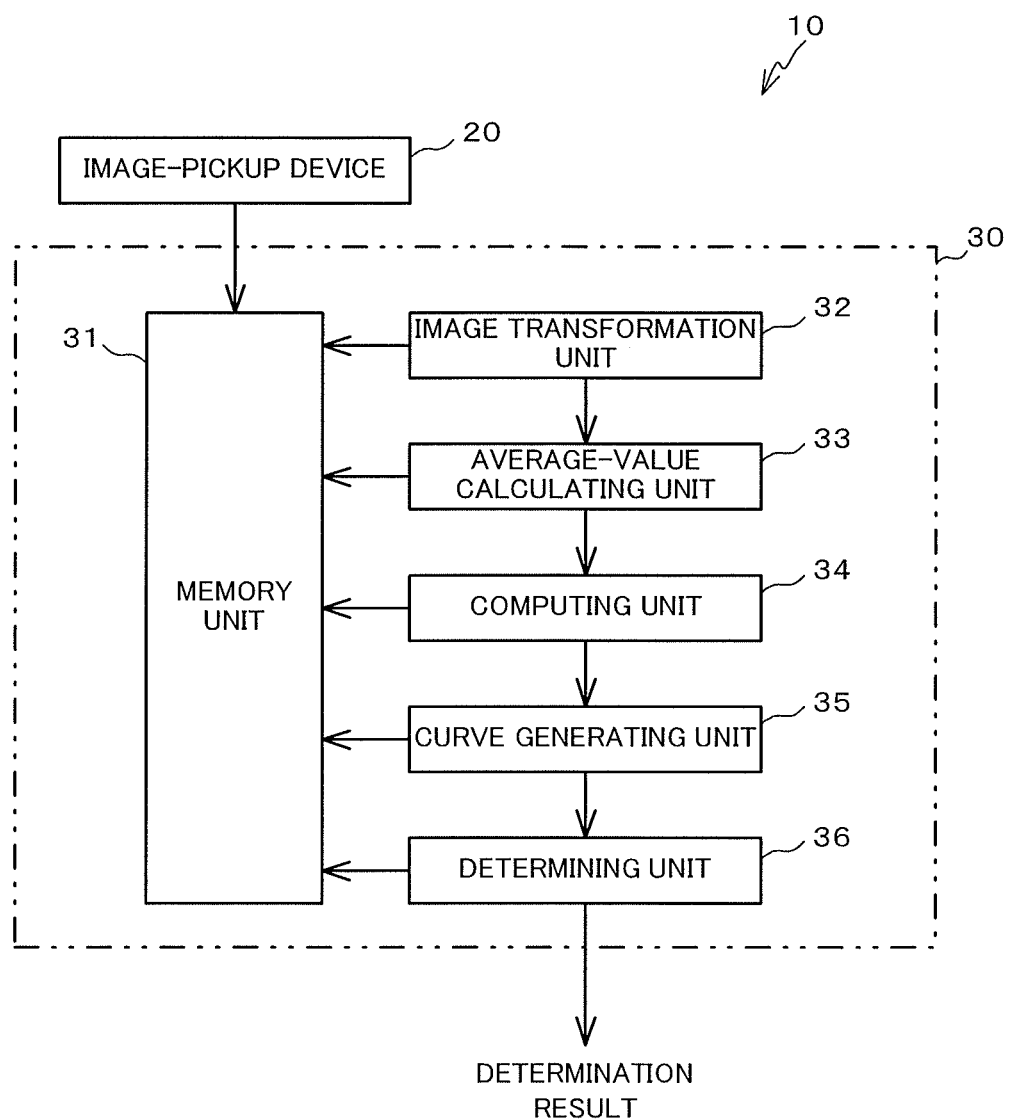
FIG. 1 is a block diagram showing a crosswalk detection system according to a first embodiment.

A first embodiment of the present invention will be explained with reference to the accompanying drawings. FIG. 1 is a block diagram showing a general configuration of a crosswalk detection system 10 according to this embodiment. The crosswalk detection system 10 is built in, for example, an automobile. This system detects a crosswalk in an image picked up by an image-pickup device 20. As shown in FIG. 1, the crosswalk detection system 10 includes the image-pickup device 20, and a crosswalk detection device 30 that detects a crosswalk from an image picked up by the image-pickup device 20.

The image-pickup device 20 employs a configuration that includes a CCD camera which transforms an image PHI obtained by imaging an object into electric signals, and outputs such signals. The image-pickup device 20 is placed on, for example, a front grill of an automobile or a bumper thereof, etc.

Figure 2:
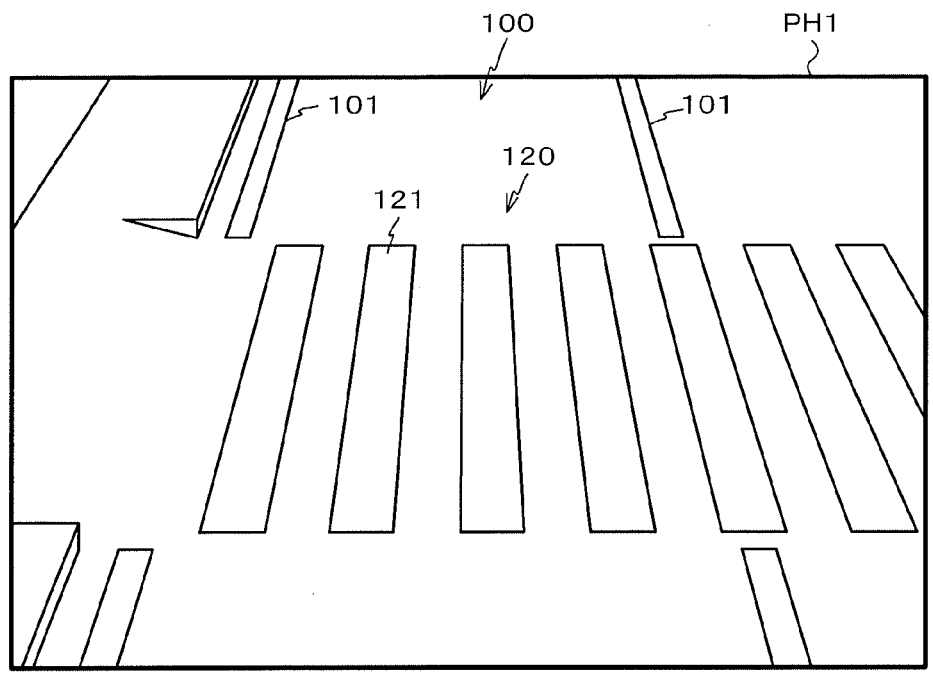
FIG. 2 is a diagram showing an example image output by an image-pickup device.

FIG. 2 is a diagram showing an example image PHI picked up by the image-pickup device 20. The image PHI contains a road 100, lines 101 defining the traffic lane of the road 100, and a crosswalk 120 traversing the road 100. As is clear with reference to this image PH1, the image-pickup device 20 has a view angle, a magnifying power, etc., adjusted so that the traffic lane defined by the lines 101 is located within the viewing field. The image-pickup device 20 successively obtains images of the road 100, and outputs information on the picked-up images.

Returning to FIG. 1, the crosswalk detection device 30 includes a memory unit 31, an image transformation unit 32, an average-value calculating unit 33, an computing unit 34, a curve generating unit 35, and a determining unit 36.

The memory unit 31 stores pieces of information on the images successively output by the image-pickup device 20 in a time series. Moreover, the memory unit 31 sequentially stores pieces of information on process results of respective units 32 to 36.

The image transformation unit 32 transforms the image PH1 picked up by the image-pickup device 20 into an image (a top view image) looking the road 100 from directly above. More specifically, the image transformation unit 32 performs a coordinate transformation process on the image PHI to generate, for example, an image PH2 shown in FIG. 3.

Figure 3:
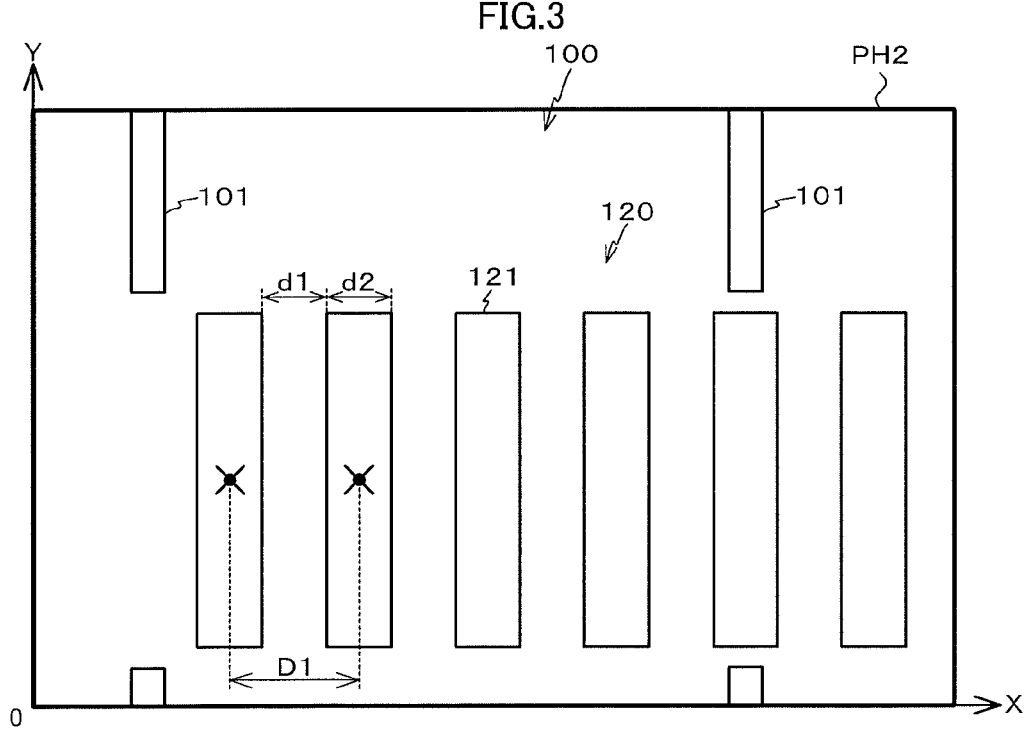
FIG. 3 is a diagram showing a transformed image.

FIG. 3 shows an X-Y coordinate system defined in the image PH2 and having a lower left corner as an origin, and the following explanation will be given with reference to this X-Y coordinate system.

As is clear when comparing the image PH1 with the image PH2, in the image PH2, the lines 101 defining the traffic lane of the road 100 are substantially parallel with the Y axis. Moreover, in the image PH2, respective white patterns 121 of the crosswalk 120 are rectangles, in which the lengthwise direction is the Y-axis direction. Respective white patterns 121 are disposed in the X-axis direction at an interval D1. A distance d1 from an edge of one of the adjoining white patterns 121 to an edge of another of the adjoining white patterns 121 is equal to a width (dimension) d2 of the white pattern 121 in the X-axis direction.

The image transformation unit 32 stores, when generating the image PH2, such an image PH2 in the memory unit 31, and notifies the average-value calculating unit 33 of the completion of the image transformation process on the image PH1.

Figure 4:
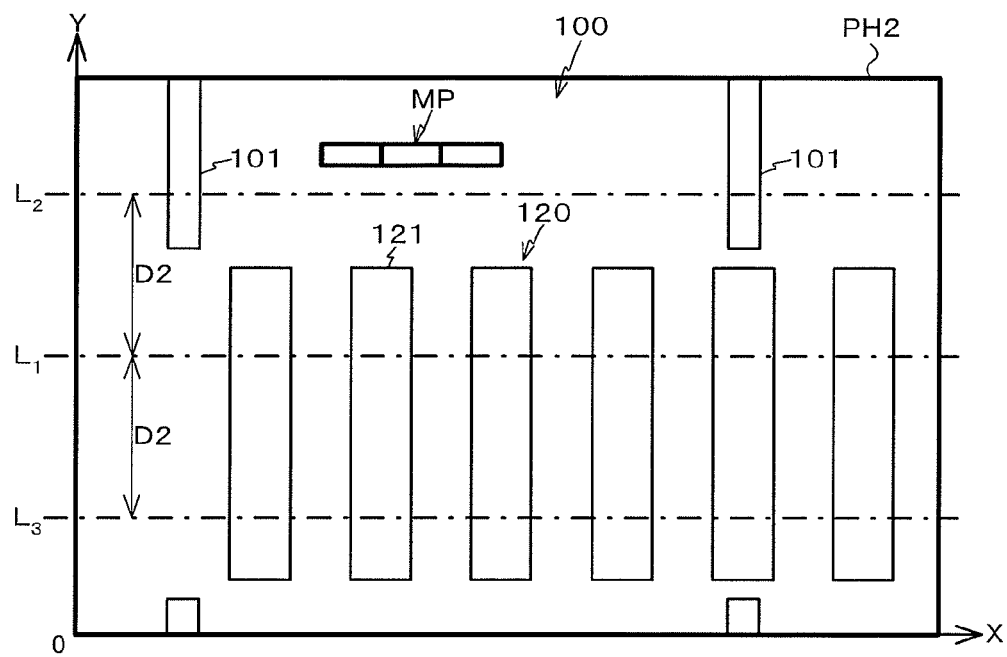
FIG. 4 is a diagram showing a main pattern defined on an image.

FIG. 4 is a diagram showing the image PH2 and a main pattern MP defined on the image PH2. The average-value calculating unit 33 defines the main pattern MP on the image PH2. Next, the average-value calculating unit 33 calculates the average value of the brightness of pixels overlapping respective sub patterns SP1 to SP3 while moving the main pattern MP along a straight line $L_1$, a straight line $L_2$, and a straight line $L_3$. The straight line $L_1$ is a straight line parallel to the X axis and passing through the center of the image PH1. The straight line $L_2$ is a straight line parallel to the X axis and distant from the straight line $L_1$ by a distance D2 in the +Y direction. The straight line $L_3$ is a straight line parallel to the X axis and distant from the straight line $L_1$ by the distance D2 in the −Y direction. The movement of the main pattern MP may arbitrary be set, such as, the movement may be for each 1 to several pixels.

The main pattern MP and the sub patterns SP1 to SP3 are regions or windows in a predetermined shape. Through the above-explained operation, the average value of the brightness of the pixels in the regions or the windows is calculated.

Figure 5:
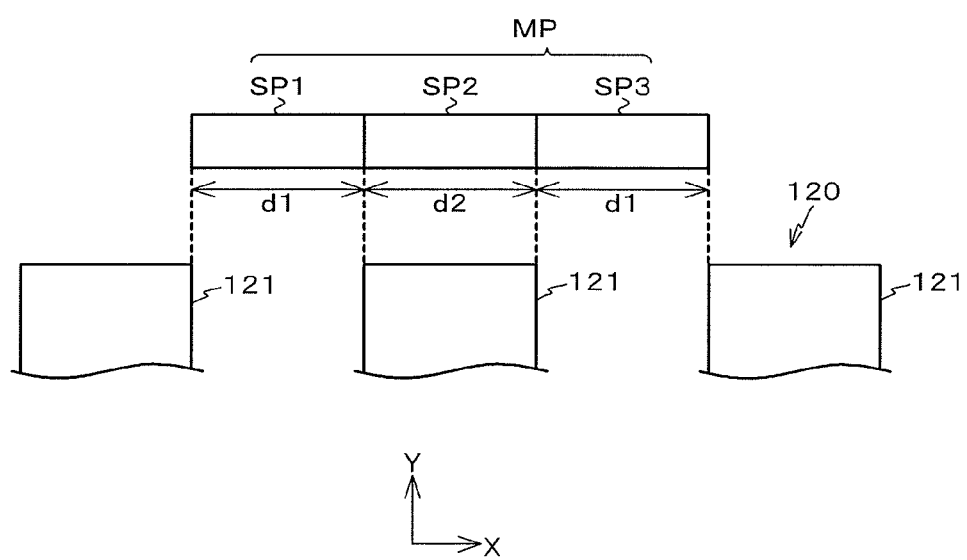
FIG. 5 is a diagram showing a main pattern in an enlarged view.

FIG. 5 is a diagram showing the main pattern MP defined on the image PH2 in an enlarged manner. As shown in FIG. 5, the main pattern MP includes the three sub patterns SP1 to SP3 placed in the X-axis direction. Respective sub patterns SP1 to SP3 are rectangles, in which the lengthwise direction is the X-axis direction. The dimensions of the sub patterns SP1 and SP3 in the X-axis direction are respectively equal to the distance d1 and the dimension of the sub pattern SP2 is equal to the distance d2.

Figure 6:
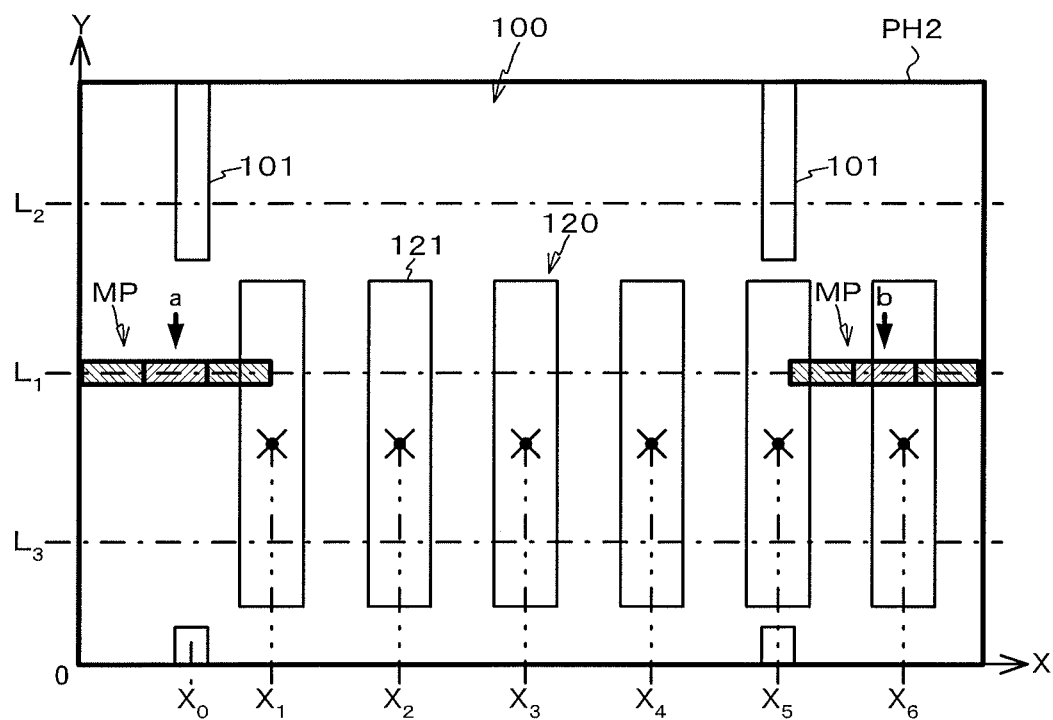
FIG. 6 is a diagram for explaining an operation of an average-value calculating unit.

FIG. 6 is a diagram for explaining an operation of the average-value calculating unit 33. As is clear with reference to FIG. 6, first, the average-value calculating unit 33 calculates the average value of the brightness of the pixels overlapping respective sub patterns SP1 to SP3 while moving the main pattern MP along the straight line $L_1$ passing through the center of the image PH2 and parallel to the X axis. Here, the main pattern MP is moved from a first position (a side of the traffic lane defined by the two lines 101) indicated by an arrow a to a second position (another side of the traffic lane) indicated by an arrow b so as to traverse the traffic lane (the road).

More specifically, the average-value calculating unit 33 defines the main pattern MP at the first position. In this position, the center of the main pattern MP is located over the straight line $L_1$. Moreover, an end of the main pattern MP at the −X side matches an end of the image PH2 at the −X side.

Next, the average-value calculating unit 33 successively calculates average values $B1_1$, $B2_1$, and $B3_1$ of the brightness of the pixels while moving the main pattern MP from the first position indicated by the arrow a to the second position indicated by the arrow b along the straight line $L_1$. The average value $B1_1$ is an average value of the brightness of the pixels overlapping the sub pattern SP1 when the center of the main pattern MP is located over the straight line $L_1$. The average value $B2_1$ is an average value of the brightness of the pixels overlapping the sub pattern SP2 when the center of the main pattern MP is located over the straight line $L_1$. The average value $B3_1$ is an average value of the brightness of the pixels overlapping the sub pattern SP3 when the center of the main pattern MP is located over the straight line $L_1$. The average-value calculating unit 33 generates, based on the calculated average values $B1_1$, $B2_1$, and $B3_1$, data $B1_1(X)$, $B2_1(X)$, and $B3_1(X)$ associated with the X coordinate of the canter of the main pattern MP when the average values $B1_1$, $B2_1$, and $B3_1$ are calculated, and outputs such pieces of data to the memory unit 31. Hence, the pieces of data $B1_1(X)$, $B2_1(X)$, and $B3_1(X)$ are stored in the memory unit 31.

When the main pattern MP reaches a position where the end thereof at the +X side matches the end of the image PH2 at the +X side, the average-value calculating unit 33 aligns the main pattern MP to a position where the center thereof is located over the straight line $L_2$ and the end at the −X side matches the end of the image PH2 at the −X side. Next, the average-value calculating unit 33 successively calculates average values $B1_2$, $B2_2$, and $B3_2$ of the brightness of the pixels while moving the main pattern MP from this position to the +X direction along the straight line $L_2$. The average value $B1_2$ is an average value of the brightness of the pixels overlapping the sub pattern SP1 when the center of the main pattern MP is located over the straight line $L_2$. The average value $B2_2$ is an average value of the brightness of the pixels overlapping the sub pattern SP2 when the center of the main pattern MP is located over the straight line $L_2$. The average value $B3_2$ is an average value of the brightness of the pixels overlapping the sub pattern SP3 when the center of the main pattern MP is located over the straight line $L_2$. The average-value calculating unit 33 generates, based on the calculated average values $B1_2$, $B2_2$, and $B3_2$, pieces of data $B1_2(X)$, $B2_2(X)$, and $B3_2(X)$ associated with the X coordinate of the center of the main pattern MP when the average values $B1_2$, $B2_2$, and $B3_2$ are calculated, and outputs such pieces of data to the memory unit 31. Hence, the pieces of data $B1_2(X)$, $B2_2(X)$, and $B3_2(X)$ are stored in the memory unit 31.

When the main pattern MP reaches a position where the end of the +X side thereof matches the end of the image PH2 at the +X side, the average-value calculating unit 33 aligns the main pattern MP to a position where the center thereof is located over the straight line $L_3$ and the end of the −X side matches the end of the image PH2 at the −X side. Next, the average-value calculating unit 33 successively calculates average values $B1_3$, $B2_3$, and $B3_3$ of the brightness of the pixels while moving the main pattern MP from this position to the +X direction along the straight line $L_3$. The average value $B1_3$ is an average value of the brightness of the pixels overlapping the sub pattern SP1 when the center of the main pattern MP is located over the straight line $L_3$. The average value $B2_3$ is an average value of the brightness of the pixels overlapping the sub pattern SP2 when the center of the main pattern MP is located over the straight line $L_3$. The average value $B3_3$ is an average value of the brightness of the pixels overlapping the sub pattern SP3 when the center of the main pattern MP is located over the straight line $L_3$. The average-value calculating unit 33 generates, based on the calculated average values $B1_3$, $B2_3$, and $B3_3$, pieces of data $B1_3(X)$, $B2_3(X)$, and $B3_3(X)$ associated with the X coordinate of the center of the main pattern MP when the average values B $1_3$, B$2_3$, and B$3_3$ are calculated, and outputs such pieces of data to the memory unit 31. Hence, the pieces of data B$1_3(X)$, B$2_3(X)$, and B$3_3(X)$ are stored in the memory unit 31. When the above-explained process completes, the average-value calculating unit 33 notifies the computing unit 34 of the completion of such a process.

In the following explanation, in order to simplify the explanation, an operation of outputting data B$1_N(X)$, B$2_N(X)$, and B$3_N(X)$ while moving the main pattern MP is referred to as a scanning operation.

The computing unit 34 executes a calculation indicated by the following formula (1) for the data B$1_N(X)$, B$2_N(X)$, and B$3_N(X)$. Note that N is an integer from 1 to 3.

$$G_N(X) = B2_N(X) - (B1_N(X) + B3_N(X))/2 \quad (1)$$

The computing unit 34 stores the calculation result G$_N(X)$ in the memory unit 31 when completing the calculation indicated by the formula (1), and notifies the curve generating unit 35 of the completion of the calculation.

The curve generating unit 35 generates a characteristic curve based on the calculation result G$_N(X)$ by the computing unit 34. More specifically, the curve generating unit plots points each defined by a value of X and a value of the calculation result G$_N(X)$ on a coordinate system having the horizontal axis for X and the vertical axis for the calculation result G$_N(X)$, and generates a characteristic curve passing through the plotted points.

Figure 7A:
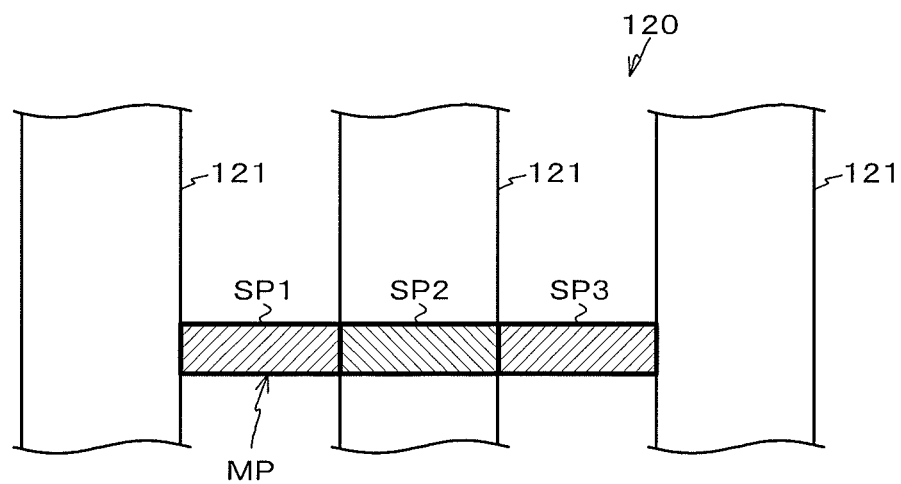
FIG. 7A is a diagram showing a main pattern during scanning.

As shown in FIG. 7A, when the sub pattern SP2 that is a part of the main pattern MP completely overlaps the white pattern 121 of the crosswalk 120, the calculation result G$_N(X)$ becomes maximum. This is because the average value B$2_N$ of the brightness of the pixels overlapping the sub pattern SP2 becomes maximum, the average values B$1_N$ and B$3_N$ of the brightness of the pixels overlapping the sub patterns SP1 and SP3 become substantially zero, and thus the calculation result G$_N(X)$ of the formula (1) becomes maximum.

Figure 7B:
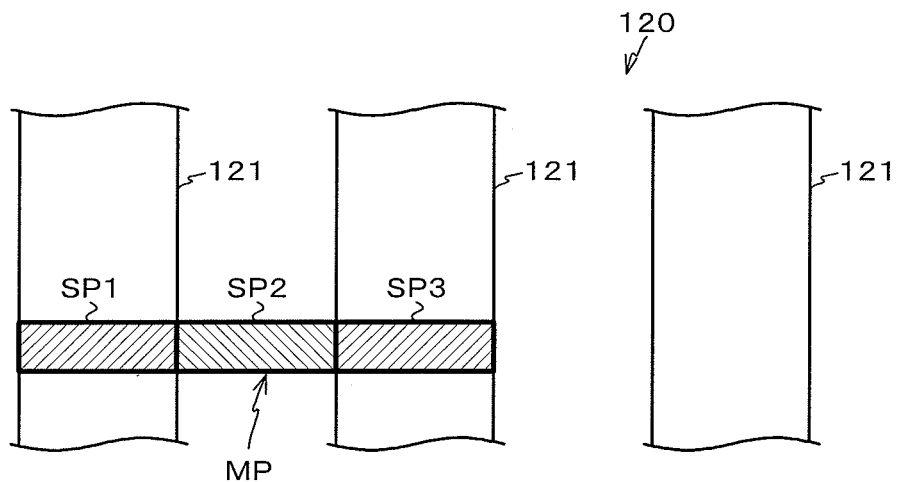
FIG. 7B is a diagram showing a main pattern during scanning.

As shown in FIG. 7B, when the sub patterns SP1 and SP3 that are parts of the main pattern MP completely overlap the white patterns 121 of the crosswalk 120, the calculation result G$_N(X)$ becomes minimum. This is because the average values B$1_N$ and B$3_N$ of the brightness of the pixels overlapping the sub patterns SP1 and SP3 become maximum, the average value B$2_N$ of the brightness of the pixels overlapping the sub pattern SP2 becomes substantially zero, and thus the calculation result G$_N(X)$ of the formula (1) becomes minimum.

Hence, when the calculation result G$_N(X)$ is a calculation result based on a result of the scanning operation along a straight line traversing the white pattern 121 of the crosswalk 120, the characteristic curve becomes a curved line having a plurality of (e.g., equal to or greater than three) peaks.

Figure 8:
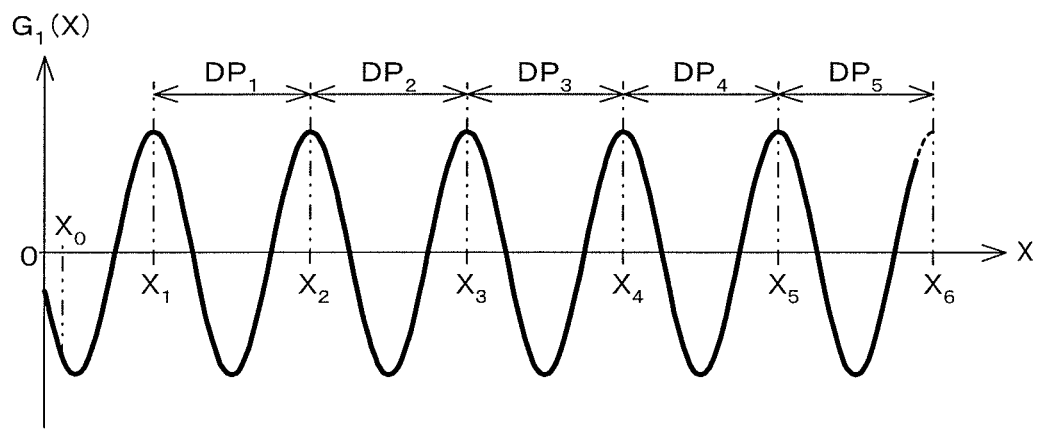
FIG. 8 is a (first) diagram showing a characteristic curve based on a scanning operation.

FIG. 8 is a diagram showing the characteristic curve generated based on a result when, for example, the scanning operation is performed along the straight line L$_1$ shown in FIG. 6. As is clear with reference to FIG. 8, when, for example, the scanning operation is performed along the straight line L$_1$, the calculation result G$_1(X)$ has peaks when the values of X are X$_1$ to X$_6$ corresponding to respective positions of the white patterns 121. Hence, the characteristic curve becomes a curved line having five peaks.

Conversely, when the calculation result G$_N(X)$ is a calculation result based on a result when the scanning operation is performed along a straight line not traversing the white patterns 121 of the crosswalk 120, the characteristic curve becomes a curved line having two peaks.

Figure 9:
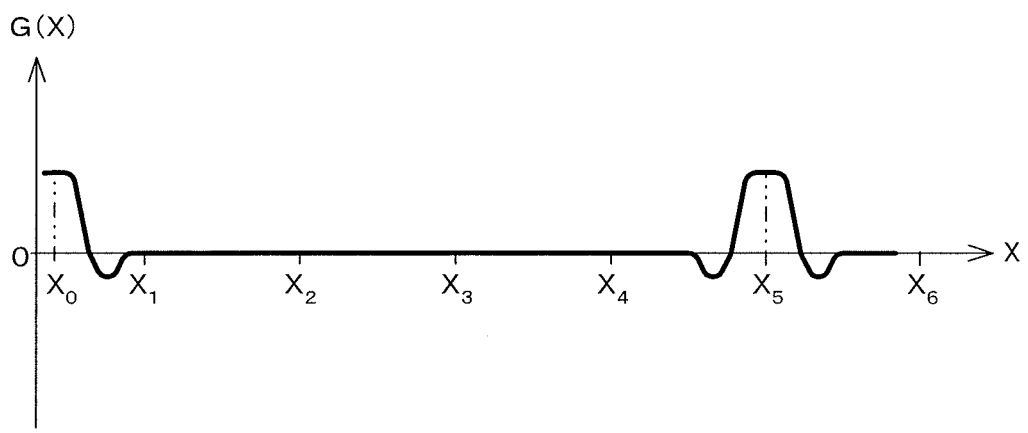
FIG. 9 is a (second) diagram showing a characteristic curve based on a scanning operation.

FIG. 9 is a diagram showing a characteristic curve generated based on a result when, for example, the scanning operation is performed along the straight line L$_2$ shown in FIG. 6. As shown in FIG. 9, when, for example, the scanning operation is performed along the straight line L$_2$, the calculation result G$_1(X)$ has peaks when the values of X are X$_0$ and X$_5$ corresponding to respective positions of the lines 101 in the image PH2. Hence, the characteristic curve becomes a curved line having two peaks.

The curve generating unit 35 generates a characteristic curve for each scanning operation performed along each of the straight lines L$_1$ to L$_3$. Next, the curve generating unit outputs information on each characteristic curve to the memory unit 31, and notifies the determining unit 36 of the completion of the generation of the characteristic curve.

Figure 10:
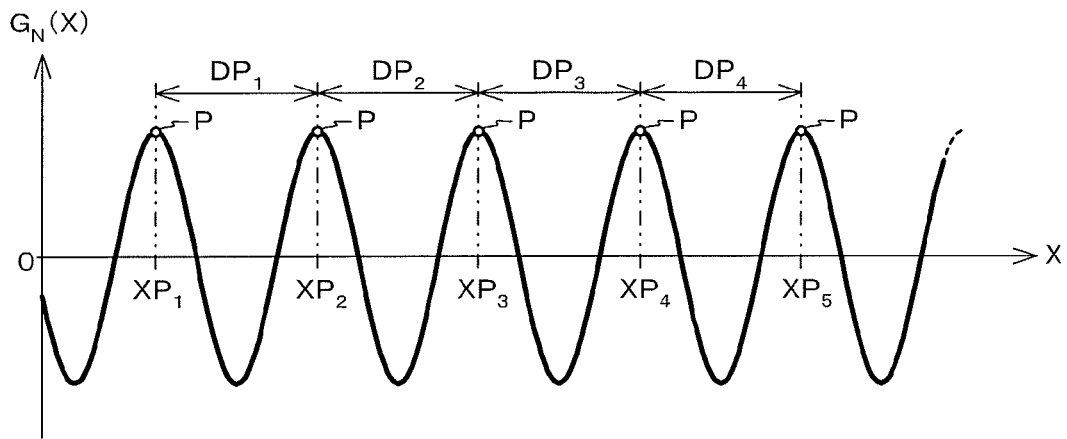
FIG. 10 is a (third) diagram showing a characteristic curve based on a scanning operation.

The determining unit 36 determines, based on the regularity of the generated characteristic curve, whether or not a crosswalk is in the image PH2. FIG. 10 is a diagram showing an example characteristic curve. As is clear with reference to FIG. 10, the determining unit 36 detects the local maximum points of the curved line as peaks P. Next, the determining unit specifies an X coordinate XP$_N$ of each detected peak P. Subsequently, the determining unit 36 executes a calculation indicated by the following formula (2), and calculates a difference DP$_N$ between the two X coordinates XP$_N$ of the peaks P of the characteristic curve. Note that N in the formula (2) is an integer corresponding to the N-th peak. The calculation result of the formula (2) is equal to a distance between mutual positions of the main pattern MP in the image PH2 when G$_N(X)$ becomes maximum.

$$DP_N = XP_{N+1} - XP_N \quad (2)$$

When the scanning operation is performed along the straight lines L$_1$ and L$_3$ (see FIG. 6) traversing the white patterns 121, for example, a characteristic curve shown in FIG. 8 can be obtained. In this case, the X coordinate XP$_N$ of the peak becomes equal to an X coordinate X$_N$ of the white pattern 121 in the image PH2. Moreover, the calculation result DP$_N$ of the formula (2) becomes equal to the interval D1 of the placement of the white patterns 121.

Conversely, when the scanning operation is performed along the straight line L$_2$ that does not traverse the white pattern 121, as shown in FIG. 9, the number of the peaks of the characteristic curve becomes smaller than three. Moreover, even if the number of the peaks is equal to or greater than three, the calculation result DP of the formula (2) does not become equal to the interval D1 of the placement of the white patterns 121.

Hence, the determining unit 36 determines that the scanning operation is performed along a straight line (e.g., the straight lines L$_1$ and L$_3$) traversing the white pattern 121 of the crosswalk 120 when, for the characteristic curve, the number of the peaks detected is equal to or greater than, for example, three and the over half of the N number of the differences DP$_N$ have a value substantially equal to the value of the interval D1 of the placement of the white patterns 121. Regarding the comparison between the value of the difference DP$_N$ and the value of the interval D1 of the placement, it is determined that both values are equal when, for example, a difference between the value of the difference DP$_N$ and the value of the interval D1 of the placement is equal to or smaller than a threshold.

Conversely, when the number of the peaks detected is not equal to or greater than three, the determining unit 36 determines, for the characteristic curve, that the scanning operation is performed along a straight line (e.g., the straight line L$_2$) that does not traverse the white pattern 121 of the crosswalk 120. Moreover, the determining unit 36 also determines that the scanning operation is performed along a straight line (e.g., the straight line $L_2$) that does not traverse the white pattern 121 of the crosswalk 120 when, for the characteristic curve, the number of the peaks detected is equal to or greater than three and the over half of the differences $DP_N$ have a value different from the value of the interval D1 of the placement.

Next, when determining that equal to or greater than two scanning operations among the three scanning operations along the straight lines $L_1$ to $L_3$, respectively, are performed along a straight line traversing the white patterns 121 of the crosswalk 120, the determining unit 36 determines that the crosswalk 120 is in the image PH2. Conversely, when determining that only one scanning operation among the three scanning operations along the straight lines $L_1$ to $L_3$, respectively, is performed along a straight line traversing the white patterns 121 of the crosswalk 120, the determining unit 36 determines that no crosswalk 120 is in the image PH2. Moreover, when determining that all scanning operations are performed not along a straight line traversing the white patterns 121, the determining unit 36 determines that no crosswalk 120 is in the image PH2. Next, the determining unit 36 outputs a result of the determination whether or not the crosswalk 120 is in the image PH2 to an external device, etc.

As explained above, according to the first embodiment, the arithmetic processing indicated by the formula (1) is performed on the pieces of data $B1_N(X)$, $B2_N(X)$, and $B3_N(X)$ obtained by the scanning operations using the main pattern MP. Next, a characteristic curve indicating a relationship between the calculation result $G_N(X)$ of the arithmetic processing and the position of the main pattern MP over the image PH2 is calculated. Subsequently, it is determined whether or not the crosswalk is in the image PH2 based on the regularity of peaks appearing on the characteristic curve.

The pieces of data $B1_N(X)$, $B2_N(X)$, and $B3_N(X)$ are averages of the brightness of the pixels overlapping respective sub patterns SP1 to SP3 of the main pattern MP. Hence, even if the white pattern 121 forming the crosswalk 120 is cracked or the white pattern 121 has a separated part, respective values of the pieces of data $B1_N(X)$, $B2_N(X)$, and $B3_N(X)$ are hardly affected.

More specifically, even if the white pattern 121 forming the crosswalk 120 is cracked or the white pattern 121 has a separated part, the number of the pixels displaying such portions is merely several percentages of the pixels overlapping the sub patterns SP1 to SP3. Hence, respective values of the pieces of data $B1_N(X)$, $B2_N(X)$, and $B3_N(X)$ are hardly affected even if the white pattern 121 is cracked, etc. Accordingly, it is possible to precisely determine whether or not the crosswalk is in the image PH2 even if the white patterns 121 of the crosswalk 120 are deteriorated with ages.

Note that respective values of the placement interval D1, and the distances d1, d2 are values corresponding to 0.45 m in the actual road 100. Moreover, the distance D2 between adjoining straight lines $L_1$ to $L_3$ is a value corresponding to 1.5 m in the actual road 100. Moreover, the dimension of the main pattern MP in the Y-axis direction is a dimension substantially equal to, for example, a pixel of the image PH2 (a dimension corresponding to a pixel). However, respective dimensions of the sub patterns SP1, SP2, and SP3 of the main pattern MP in the Y-axis direction can be changed appropriately as needed. For example, respective dimensions in the Y-axis direction may be a dimension corresponding to several pixels. Moreover, respective dimensions in the Y-axis direction may be, for example, constant or may change along the X-axis direction.

<<Second Embodiment>>

Next, a second embodiment of the present invention will be explained with reference to FIGS. 11 to 17. The same or equivalent structural element as that of the first embodiment will be denoted by the same reference numeral, and the duplicated explanation thereof will be omitted or simplified.

A crosswalk detection system 10 of this embodiment differs from the crosswalk detection system 10 of the first embodiment that a crosswalk detection device 30 employs a similar configuration to that of a typical computer or a microcomputer, etc.

Figure 11:
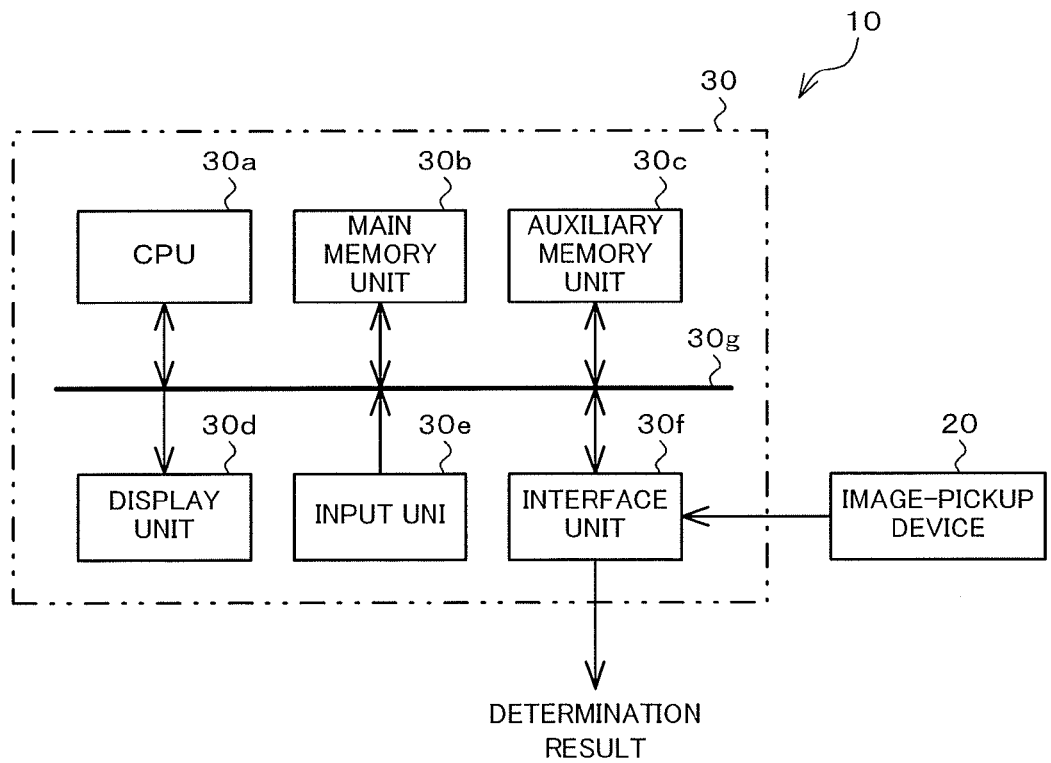
FIG. 11 is a block diagram showing a crosswalk detection system according to a second embodiment.

FIG. 11 is a block diagram showing a physical configuration of the crosswalk detection system 10. As shown in FIG. 11, the crosswalk detection system 10 includes the image-pickup device 20 and the crosswalk detection device 30 configured by a computer.

The crosswalk detection device 30 includes a CPU (Central Processing Unit) 30a, a main memory unit 30b, an auxiliary memory unit 30c, a display unit 30d, an input unit 30e, an interface unit 30f, and a system bus 30g connecting those units one another.

The CPU 30a executes a process to be discussed later on the image PH1 output by the image-pickup device 20 in accordance with a program stored in the auxiliary memory unit 30c.

The main memory unit 30b includes a RAM (Random Access Memory), etc., and is used as a work area for the CPU 30a.

The auxiliary memory unit 30c includes a non-volatile memory, such as a ROM (Read Only Memory), a magnetic disk, or a semiconductor memory. The auxiliary memory unit 30c stores the program run by the CPU 30a, and various parameters, etc. Moreover, the auxiliary memory unit successively stores information on the image output by the image-pickup device 20 and information containing a process result, etc., by the CPU 30a.

The display unit 30d includes a CRT (Cathode Ray Tube) or an LCD (Liquid Crystal Display), etc., and displays a process result by the CPU 30a.

The input unit 30e includes pointing devices, such as a keyboard and a mouse. An instruction given by an operator is input through the input unit 30e, and is transmitted to the CPU 30a via the system bus 30g.

The interface unit 30f includes a serial interface or a LAN (Local Area Network) interface, etc. The image-pickup device 20 is connected to the system bus 30g via the interface unit 30f.

Figure 12:
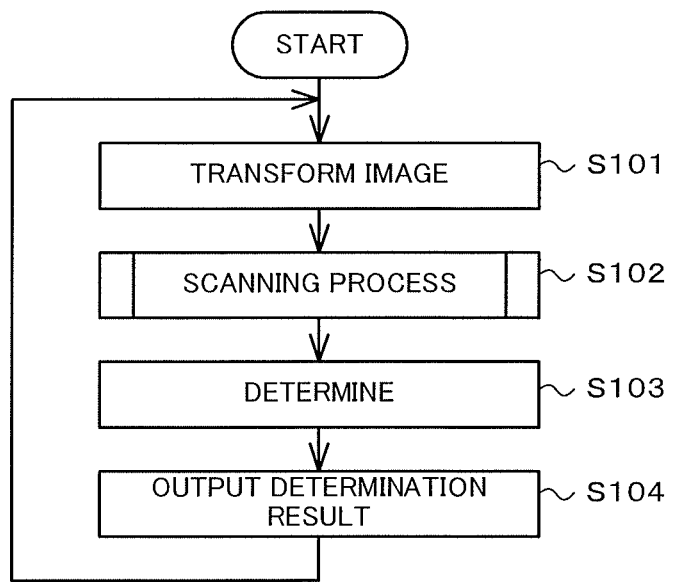
FIG. 12 is a (first) flowchart for explaining an operation of a crosswalk detection device.
Figure 13:
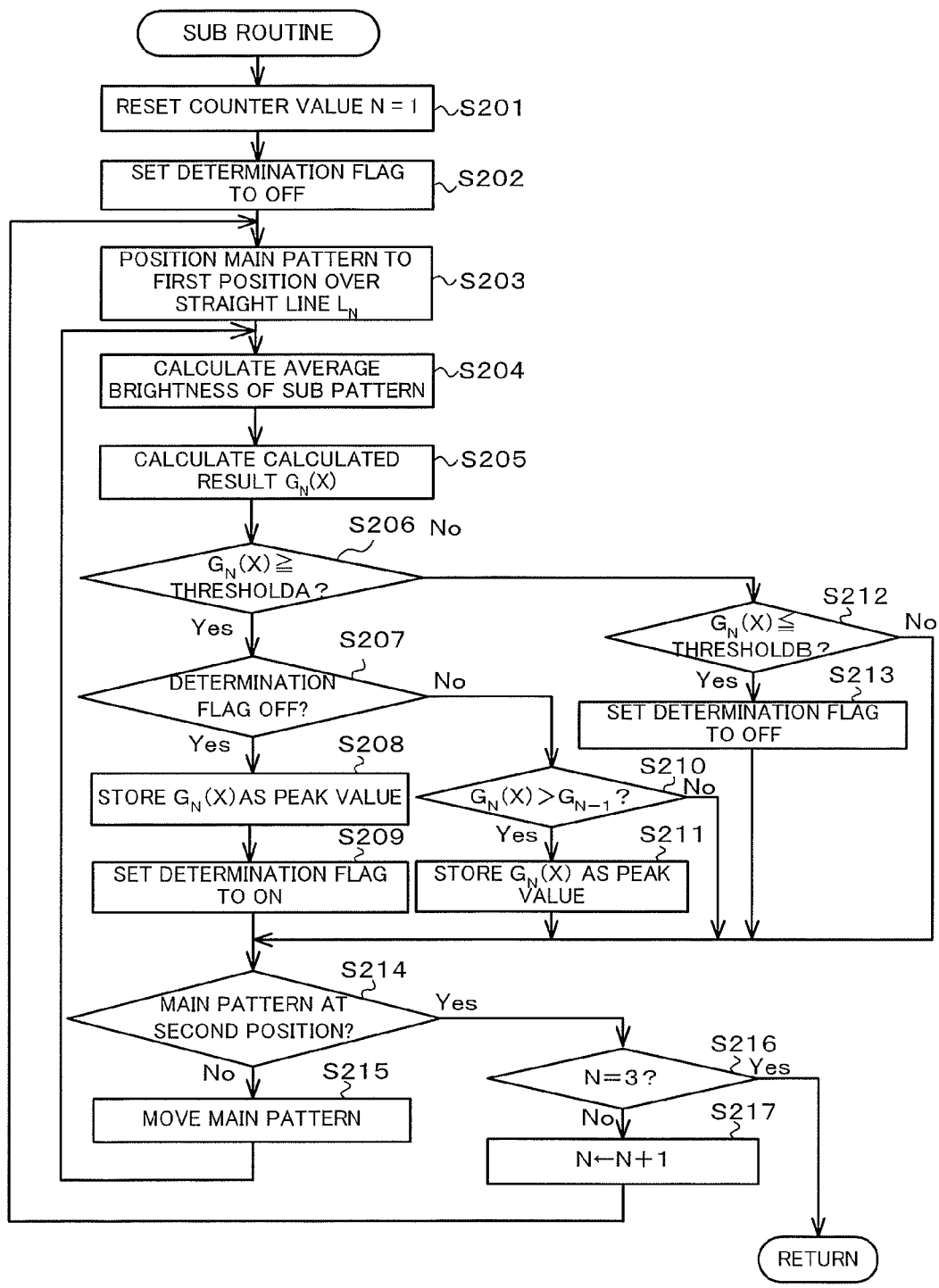
FIG. 13 is a (second) flowchart for explaining an operation of the crosswalk detection device.

The flowcharts of FIGS. 12 and 13 correspond to successive process algorithms of the program run by the CPU 30a. An explanation will now be given of the process executed by the crosswalk detection device 30 with reference to FIG. 12. This process is executed after the crosswalk detection system 10 is activated and the image-pickup device 20 outputs information on a picked-up image. It is presumed that the image-pickup device 20 outputs the image PH1 shown in FIG. 2.

First, in an initial step 5101, the CPU 30a transforms the image PH1 picked up by the image-pickup device 20 into an image (a top view image) looking the road 100 from directly above. More specifically, the image transformation unit 32 performs a coordinate transformation process on the image PH1 to generate the image PH2 shown in, for example, FIG. 3.

In a next step S102, the CPU 30a performs the scanning process on the image PH2. FIG. 13 is a diagram showing a sub routine executed in the step S102. The CPU 30a realizes the process in the step S102 by executing the sub routine shown in FIG. 13.

In an initial step S201 in the sub routine, the CPU 30a resets a value of the counter N. Hence, the value of the counter N is set to an initial value that is 1.

In a next step S202, the CPU 30a sets a determination flag to be OFF.

In a next step S203, the CPU 30a aligns the main pattern to a first position (a position indicated by the arrow a in FIG. 3) on a straight line $L_N$. At this position, the center of the main pattern MP is located over the straight line $L_1$. Moreover, the end of the main pattern MP at the −X side matches the end of the image PH2 at the −X side.

In a next step S204, the CPU 30a successively calculates the average value $B1_1$ of the brightness of the pixels overlapping the sub pattern SP1, the average value $B2_1$ of the brightness of the pixels overlapping the sub pattern SP2, and the average value $B3_1$ of the brightness of the pixels overlapping the sub pattern SP3. Next, for respective brightness average values, the CPU 30a generates the pieces of data $B1_N(X)$, $B2_N(X)$, $B3_N(X)$ associated with the X coordinate of the main pattern MP.

In a next step S205, the CPU 30a executes the calculation indicated by the above-explained formula (1) for respective pieces of the data $B1_N(X)$, $B2_N(X)$, $B3_N(X)$. Hence, the calculation results $G_N(X)$ are calculated.

Figure 14:
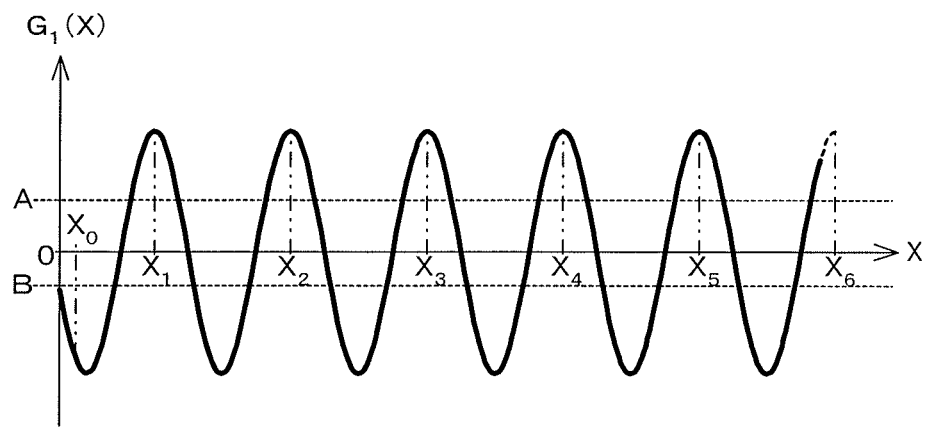
FIG. 14 is a diagram showing a relationship between a characteristic curve and thresholds A, B.

In a next step S206, the CPU 30a determines whether or not the value of the calculation result $G_N(X)$ is equal to or greater than a threshold A that is equal to or greater than zero. FIG. 14 shows a relationship between the characteristic curve obtained based on a result of the scanning operation performed along the straight line $L_1$ and thresholds A, B. The main pattern MP is located at the first position where the X coordinate is zero. Hence, the calculation result $G_N(X)$ is smaller than the threshold A. Accordingly, the determination in the step S206 becomes a negative result (step S206: NO), and the CPU 30a progresses the process to step S212.

In the step S212, the CPU 30a determines whether or not the value of the calculation result $G_N(X)$ is equal to or smaller than the threshold B that is equal to or smaller than zero. As shown in FIG. 14, in this example, the calculation result $G_N(X)$ is equal to or smaller than the threshold B. Hence, the CPU 30a progresses the process to step S213.

In the step S213, the CPU 30a sets the determination flag to be OFF.

In step S214, the CPU 30a determines whether or not the main pattern MP is located on the second position (the position indicated by the arrow b in FIG. 6). Since the main pattern MP is located on the first position in this example, the determination in the step S214 becomes a negative result (step S214: NO), and the CPU 30a progresses the process to a next step S215.

In the step S215, the CPU 30a moves the position of the main pattern MP by a slight distance to the +X direction. Next, the process returns to the step S204.

Subsequently, the CPU 30a repeats the processes of the steps S204 to S206 and the processes of the steps S212 to S215, and the main pattern MP is moved to the X direction. The value of the calculation result $G_N(X)$ changes as is indicated by the characteristic curve shown in FIG. 14 together with the movement of the main pattern. Thereafter, the value of the calculation result $G_N(X)$ becomes equal to or smaller than the threshold A and is larger than the threshold B. In this case, the determination in the step S212 becomes a negative result (step S212: NO), and the CPU 30a directly progresses the process to the step S214.

Next, the CPU 30a repeats the processes of the steps S204 to S206 and the processes of the steps S212, S214, and S215, and the value of the calculation result $G_N(X)$ becomes larger than the threshold B. In this case, the determination in the step S206 becomes a positive result (step S206: YES), and the CPU 30a progresses the process to step S207.

In the step S207, the CPU 30a determines whether or not the determination flag is OFF. In this example, the determination flag is OFF. Hence, the determination in the step S207 becomes a positive result (step S207: YES), and the CPU 30a progresses the process to step S208.

In the step S208, the CPU 30a stores the calculation result $G_N(X)$ as a peak value in the memory unit 31.

In a next step S209, the CPU 30a sets the determination flag to be ON.

Next, the CPU 30a executes the processes of the steps S214 and S215, and executes the processes of the steps S204 to S206. At this time, the determination flag is set to be ON. Hence, the determination in the step S207 becomes a negative result (step S207: NO). In this case, the CPU 30a progresses the process to step S210.

In the step S210, the CPU 30a determines whether or not the calculation result $G_N(X)$ is larger than a calculation result $G_{N-1}(X)$ stored right before. When the X coordinate of the main pattern MP is equal to or smaller than $X_1$, the determination in the step S210 becomes a positive result (step S210: YES), and the CPU 30a progresses the process to step S211.

In the step S211, the CPU 30a stores the calculation result $G_N(X)$ as a peak value. Accordingly, the calculation result $G_N(X)$ is updated.

Figure 15:
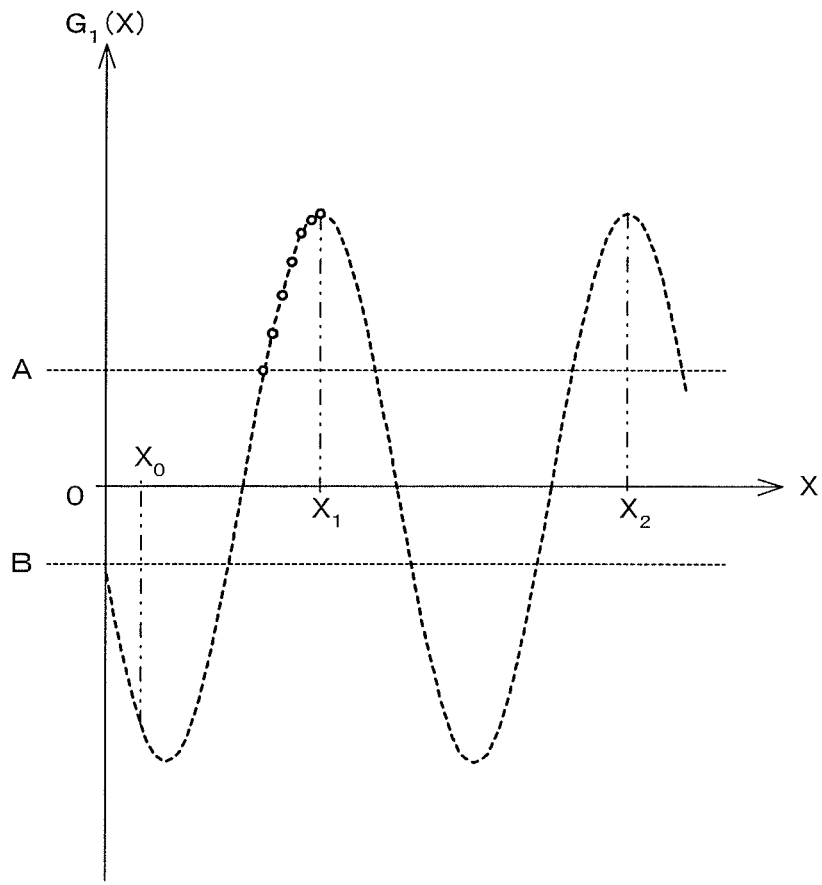
FIG. 15 is a (first) diagram for explaining a procedure of specifying a peak.
Figure 16:
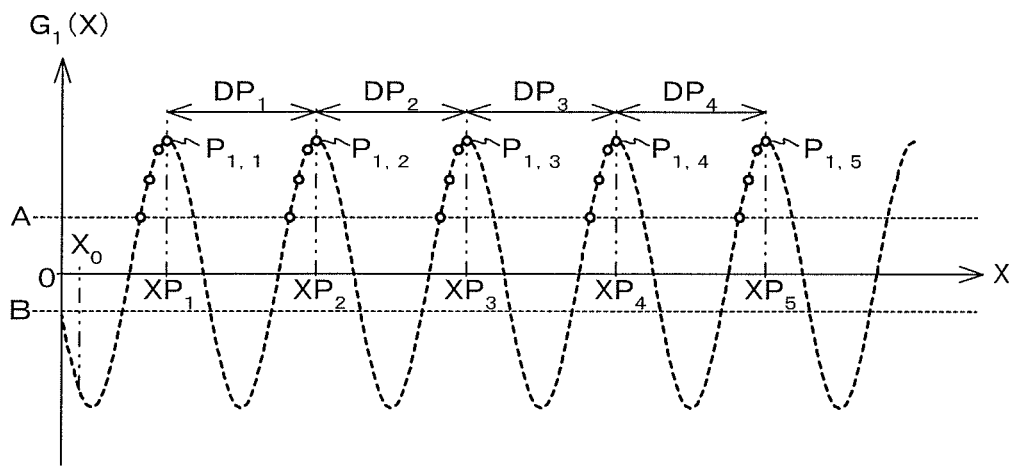
FIG. 16 is a (second) diagram for explaining a procedure of specifying a peak.

Subsequently, the CPU 30a repeatedly executes the processes of the steps S214, S215, S204 to S207, and the steps S210 and S211, and as is indicated by a white circle in FIG. 15, the peak value is updated.

Conversely, when the X coordinate of the main pattern MP exceeds $X_1$, the determination in the step S210 becomes a negative result (step S210: NO), and the CPU 30a progresses the process to the step S214.

Thereafter, the main pattern MP is moved to the second position, and the processes of the steps S201 to S215 are repeatedly executed until the determination in the step S214 becomes a positive result (step S214: YES). Hence, the scanning operation along the straight line $L_1$ completes, and as is indicated by a white circle in FIG. 16, the peak is updated, and a plurality of peaks $P_1$ are determined eventually.

When the determination in the step S214 becomes a positive result (step S214: YES), the CPU 30a progresses the process to step S216.

In the step S216, the CPU 30a determines whether or not the value of the counter N is 3. Since the value of the counter N is 1, the determination in the step S216 becomes a negative result (step S216: NO), and the CPU 30a progresses the process to step S217.

In the step S217, the CPU 30a increments the value of the counter N by 1, and returns the process to the step S203.

Figure 17:
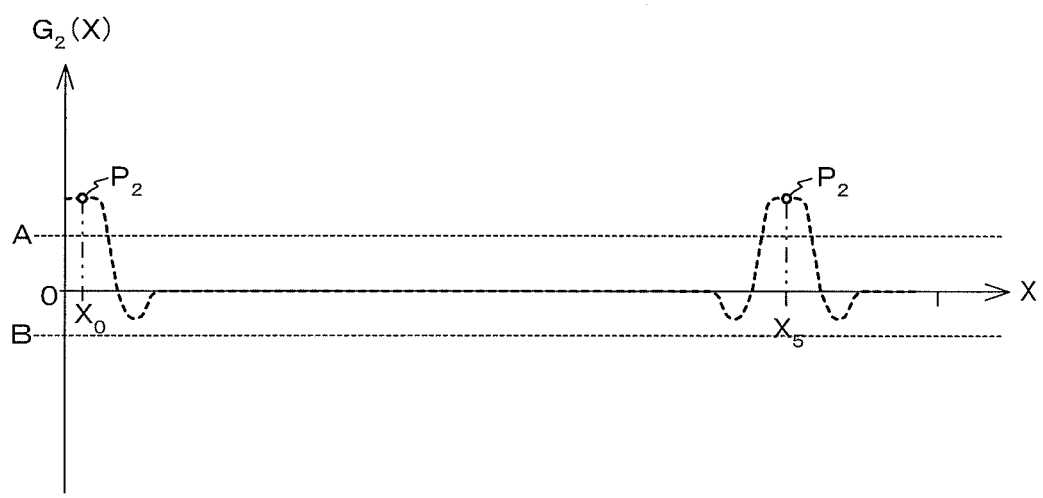
FIG. 17 is a (third) diagram for explaining a procedure of specifying a peak.

Thereafter, until the value of the counter becomes 3 and the determination in the step S216 becomes a positive result (step S216: YES), the processes of the steps S201 to S214 are repeatedly executed. Hence, the scanning operation along the straight line $L_2$ is performed and eventually, a plurality of (two) peaks $P_2$ shown in FIG. 17 are determined. Moreover, the scanning operation along the straight line $L_3$ is performed and eventually, a plurality of peaks $P_3$ are determined.

When the value of the counter N becomes 3 and the determination in the step S216 becomes a positive result (step S216: YES), the CPU 30a ends the sub routine, and progresses the process to step S103.

In the next step S103, the CPU 30a determines whether or not the crosswalk 120 is in the image PH2 based on the peak P determined through the scanning operation in the step S102.

For example, the CPU 30a specifies an X coordinate $XP_M$ of a peak $P_{N,M}$ for each scanning operation along the straight line $L_N$. Note that N indicates the line number, and M indicates a peak number. Next, the CPU 30a calculates the difference $DP_N$ between adjoining X coordinates $XP_M$ shown in FIG. 16. Subsequently, when the number of the peaks detected is equal to or greater than three and the over half of the values of the N number of differences $DP_N$ are substantially equal to the value of the interval D1 of the placement of the white patterns 121, the CPU 30a determines that the scanning operation is performed along a straight line (e.g., the straight line $L_1$ or $L_3$) traversing the white patterns 121 of the crosswalk 120.

Conversely, when the number of the peaks detected is not equal to or greater than three for the characteristic curve, the CPU 30a determines that the scanning operation is performed along a straight line (e.g., the straight line $L_2$) not traversing the white patterns 121 of the crosswalk 120. Moreover, when the number of the peaks detected is equal to or greater than three but the value of the difference $DP_N$ differs from the value of the placement interval D1, the CPU 30a also determines that the scanning operation is performed along a straight line (e.g., the straight line $L_2$) not traversing the white patterns 121 of the crosswalk 120.

When determining that equal to or greater than two scanning operations among the three scanning operations along the straight lines $L_1$ to $L_3$ are performed along the straight lines traversing the white patterns 121 of the crosswalk 120, the CPU 30a determines that the crosswalk 120 is in the image PH2. Conversely, when determining that only one scanning operation among the three scanning operations along the straight lines $L_1$ to $L_3$ is performed along a straight line traversing the white patterns 121 of the crosswalk 120, the CPU 30a determines that the crosswalk 120 is not in the image PH2. Moreover, when determining that all scanning operations are performed along straight lines not traversing the white patterns 121, the CPU 30a determines that no crosswalk 120 is in the image PH2.

In a next step S104, the CPU 30a outputs the determination result on whether or not the crosswalk 120 in the image PH2 to an external device, etc.

As explained above, according to the second embodiment, the arithmetic processing indicated by the formula (1) is performed on the pieces of data $B1_N(X)$, $B2_N(X)$, $B3_N(X)$ obtained by the scanning operations using the main pattern MP. Next, the peaks of the characteristic curve indicating a relationship between the calculation result $G_N(X)$ and the position of the main pattern MP on the image PH2 are determined, and based on the regularity of the peaks, it is determined whether or not the crosswalk is in the image PH2.

The above-explained pieces of data $B1_N(X)$, $B2_N(X)$, $B3_N(X)$ are averages of the brightness of the pixels overlapping respective sub patterns SP1 to SP3 of the main pattern MP. Hence, even if the white pattern 121 forming the crosswalk 120 is cracked or the white pattern 121 has a separated part, respective values of the data $B1_N(X)$, $B2_N(X)$, $B3_N(X)$ are hardly affected. Accordingly, even if the white patterns 121 of the crosswalk 120 are deteriorated with ages, it is possible to precisely determine whether or not the crosswalk is in the image PH2.

According to this embodiment, after equal to or greater than three peaks are specified, the scanning operation is performed. However, the present invention is not limited to this case, and when, for example, two peaks can be specified, the scanning operation may be terminated and a mutual difference $DP_1$ between an X coordinate $XP_1$ and an X coordinate $XP_2$ of the peaks may be calculated. Next, when such a difference $DP_1$ is substantially equal to the value of the interval D1 of the placement of the white patterns 121, it may be determined that the scanning operation is performed along a straight line traversing the white patterns 121.

The explanation was given of the embodiments of the present invention, but the present invention is not limited to the above-explained embodiments.

For example, according to the above-explained embodiments, three scanning operations along the straight lines $L_1$ to $L_3$, respectively, are performed. However, the present invention is not limited to this case, and the crosswalk detection system 10 may perform the scanning operation equal to or greater than four times. Moreover, it is fine if the crosswalk detection system determine whether or not the crosswalk is in the image PH2 through one scanning operation. In this case, a configuration is possible which performs the scanning operation successively from the upper part of the image and which terminates the scanning operation when it is determined that the crosswalk is in the image.

Moreover, according to the above-explained embodiments, the straight line $L_1$ passes through the center of the image PH1. However, the present invention is not limited to this case and the straight line $L_1$ may be a straight line not passing through the center of the image PH1. Respective positions of the straight lines $L_1$ to $L_3$ in the image PH may be appropriate positions depending on, for example, the kind of an automobile, the position where the image-pickup device 20 is mounted, and other conditions.

Furthermore, according to the above-explained embodiments, in order to detect the crosswalk in the image PH, respective average values $B1_N$, $B2_N$, and $B3_N$ of the brightness of the pixels overlapping respective sub patterns SP1, SP2, and SP3 are used. However, the present invention is not limited to this case, and $B1_N$, $B2_N$, and $B3_N$, respectively, may be a value of an index indicating the whole brightness of the pixels overlapping respective sub patterns SP1, SP2, and SP3. For example, $B1_N$, $B2_N$, and $B3_N$, respectively, may be a total, etc., of the brightness of the pixels overlapping respective sub patterns SP1, SP2, and SP3.

Moreover, it is fine if $B1_N$, $B2_N$, and $B3_N$ are calculated values calculated based on the brightness of the pixels overlapping respective sub patterns SP1, SP2, and SP3. For example, $B1_N$, $B2_N$, and $B3_N$ may be an average value, a total, etc., of the values for evaluating the brightness of the pixels obtained based on the brightness of the pixels, not the average value, the total, etc., of the brightness itself of the pixels overlapping respective sub patterns SP1, SP2, and SP3. The evaluation value may be set arbitrary in accordance with the brightness of the pixel. That is, the evaluation value may be associated with the brightness of the pixel in such a way that the higher the brightness of the pixel is, the larger the evaluation value becomes continuously or in a step-by-step manner. Moreover, the evaluation value may be associated with the brightness of the pixel in such a way that the lower the brightness of the pixel is, the smaller the evaluation value becomes continuously or in a step-by-step manner.

An explanation will be given of an example evaluation value set to be large step by step in accordance with the brightness of the pixel. For example, when the brightness of the pixel is equal to or higher than a first threshold, an evaluation value of "1" is associated with such brightness of the pixel. Moreover, when the brightness value of the pixel is lower than a second threshold (<first threshold), an evaluation value of "0" is associated with such brightness of the pixel. Furthermore, when the brightness of the pixel is equal to or higher than the second threshold but is lower than the first threshold, an evaluation value of "0.5" or the brightness itself of the pixel is associated with such brightness of the pixel.

According to the above-explained embodiments, the explanation was given of the example case in which the main pattern MP includes the three sub patterns which are the sub pattern SP2 that is a first sub pattern and the sub patterns SP1 and SP3 that are second sub patterns. However, the present invention is not limited to this case, and the main pattern MP may include only the sub pattern SP1 that is the second sub pattern and the sub pattern SP2 that is the first sub pattern. In this case, it is appropriate if the computing unit 34 executes a calculation indicated by the following formula (3) for the pieces of data $B1_N(X)$, and $B2_N(X)$.

$$G_N(X) = B2_N(X) - B1_N(X) \quad (3)$$

According to the above-explained embodiments, $G_N(X)$ is obtained by executing a calculation using the formula (1). $G_N(X)$ is an index indicating the level of the consistency of the sub pattern SP2 that is the first sub pattern and the white pattern 121 in the image PH2 that is the image used for the calculation, and how to determine such an index is not limited to the above-explained scheme. $G_N(X)$ may be obtained through a calculation based on, for example, the following formula (4) or the following formula (5). For example, in the formulae (4) and (5), the value of a coefficient $k_1$ may be 2, and the value of a coefficient $k_2$ may be 1.

$$G_N(X) = k_1 \cdot B2_N(X) - k_2 \cdot (B1_N(X) + B3_N(X))/2 \quad (4)$$

$$G_N(X) = k_1 \cdot B2_N(X) - k_2 \cdot B1_N(X) \quad (5)$$

According to the above-explained embodiments, the CPU 30a moves the main pattern MP from the first position at a side of the traffic lane defined by the lines 101 to the second position at another side in the scanning operation. However, the present invention is not limited to this operation, and when the whole crosswalk 120 is in the image, the CPU 30a may move the main pattern MP from a side (+X side) of the road 100 to another side (−X side) thereof in the scanning operation.

According to the above-explained embodiments, the CPU 30a moves the main pattern MP from the position where the −X-side end of such a pattern matches the −X-side end of the image PH2 to the +X direction in the scanning operation. However, the present invention is not limited to this operation, and when respective positions of the lines 101 of the road 100 are known, the CPU 30a may move the main pattern MP between the two lines 101 shown in, for example, FIG. 3 in the scanning operation. A specific example case in which respective positions of the lines 101 of the road 100 are known is a case in which the CPU 30a detects in advance the lines 101 by executing an image processing, etc.

In this case, since the distance of moving the main pattern MP is reduced, the amount of information processed by the crosswalk detection system 10 becomes little. As a result, the crosswalk detection system 10 becomes able to complete the process within a short time.

Moreover, according to the above-explained embodiments, the CPU 30a transforms the image PH1 picked up by the image-pickup device 20 into the image PH2, but the present invention is not limited to this case. For example, the CPU 30a may define the main pattern MP directly on the image PH1, and may perform the scanning operation using this main pattern MP. More specifically, the CPU 30a defines, like the image PH2, the XY coordinate system having the lower left corner as an origin and the main pattern MP on the image PH1 before transformed by the image transformation unit 32. Next, the CPU 30a performs the scanning operation on the image PH1 using the main pattern MP. In this case, it is necessary to change the dimension of the main pattern MP in the X-axis direction appropriately in accordance with the Y coordinate of the main pattern MP. This is because in the image PH1 imaging the road 100 ahead of a vehicle, the road 100 in the image PH1 has a width becoming narrow as coming closer to a disappearing point of the image PH1 (as becoming more distant from the image-pickup device 20).

According to the above-explained embodiments, the explanation was given of the case in which the sub patterns SP1 to SP3 adjoin to each other. However, the present invention is not limited to this case, and the sub patterns SP1 to SP3 may be disposed with a predetermined clearance. For example, respective sub patterns SP1 to SP3 shown in FIG. 5 may have a dimension in the X-axis direction reduced by, for example, 0.1 in while maintaining respective center positions, and the main pattern MP may be configured by such sub patterns SP1 to SP3.

Furthermore, the functions of the crosswalk detection device 30 according to the above-explained embodiments can be realized by not only exclusive hardware resources but also a normal computer system.

The program stored in the auxiliary memory unit 30c in the crosswalk detection device 30 of the second embodiment may be distributed while being stored in a computer-readable recording medium, such as a flexible disk, a CD-ROM (Compact Disk Read-Only Memory), a DVD (Digital Versatile Disk), or an MO (Magneto-Optical disk), and such a program is installed in a computer to configure the device executing the above-explained processes.

Moreover, such a program may be stored in a disk device, etc., of a predetermined server device over a communication network like the Internet, and may be downloaded to a computer while being superimposed on, for example, carrier waves.

Furthermore, the program may be activated and executed while being transferred via a communication network.

All portions or some portions of the program may be executed over a server device. In this case, a computer terminal exchanges information on the processes by such a program with the server device via a communication network, thereby executing the above-explained image processing.

When an OS (Operating System) bears and realizes the above-explained functions or the OS and an application cooperatively realize the above-explained functions, portions other than the OS only may be stored in a medium and distributed, and for example, may downloaded to a computer.

The present invention can be carried out through various embodiments and modifications thereof without departing from the broad spirit and scope of the present invention. The above-explained embodiments are to explain the present invention, and are not to limit the scope of the present invention.

This application claims the benefit of priority based on Japanese Patent Application No. 2010-058286 filed on Mar. 15, 2010, and the whole specification, claims, and drawings of Japanese Patent Application No. 2010-058286 are herein incorporated in this specification by reference.

INDUSTRIAL APPLICABILITY

The crosswalk detection device, the crosswalk detection method and the program of the present invention are suitable for detecting a crosswalk in an image.

DESCRIPTION OF REFERENCE NUMERALS

10 Crosswalk detection system
20 Image-pickup device
30 Crosswalk detection device
30a CPU
30b Main memory unit
30c Auxiliary memory unit 30d Display unit
30e Input unit
30f Interface unit
30g System bus
31 Memory unit
32 Image transformation unit
33 Average-value calculating unit
34 Computing unit
35 Curve generating unit
36 Determining unit
100 Road
101 Line
120 Crosswalk
121 White pattern
MP Main pattern
PH1 Image
PH2 Image
SP1 Sub pattern
SP2 Sub pattern
SP3 Sub pattern

The invention claimed is:

1. A crosswalk detection device comprising:
calculating unit that calculates, while moving a main pattern including a first sub pattern corresponding to white patterns of a crosswalk appearing in an image and a second sub pattern corresponding to a region between the white patterns from a first position on the image to a second position different from the first position, a first calculated value calculated based on brightness of pixels overlapping the first sub pattern and a second calculated value calculated based on brightness of pixels overlapping the second sub pattern;
computing unit that performs arithmetic processing using the first calculated value and the second calculated value; and
determining unit that determines whether or not an image of the crosswalk is present between the first position and the second position based on a regularity of a relationship between a position of the main pattern and a process result by the computing unit.

2. The crosswalk detection device according to claim 1, wherein the computing unit obtains a difference between the first calculated value and the second calculated value.

3. The crosswalk detection device according to claim 1, wherein the calculating unit
calculates a value that is an index of a whole brightness of the first sub pattern as the first calculated value, and
calculates a value that is an index of a whole brightness of the second sub pattern as the second calculated value.

4. The crosswalk detection device according to claim 1, wherein
the computing unit obtains a level of consistency between the first sub pattern and the white pattern in the image using the first calculated value and the second calculated value, and
the determining unit determines whether or not the image of the crosswalk is present between the first position and the second position based on a regularity of a relationship between a position of the main pattern in a moving direction of the main pattern and the level of consistency that is a process result by the computing unit.

5. The crosswalk detection device according to claim 1, wherein
the first position is defined at a side of a traffic lane of a road appearing in the image, and
the second position is defined at another side of the traffic lane of the road appearing in the image.

6. The crosswalk detection device according to claim 1, wherein
the first position is defined at a side of a road appearing in the image, and
the second position is defined at another side of the road appearing in the image.

7. The crosswalk detection device according to claim 1, wherein the first position is defined on a line defining a traffic lane of a road.

8. The crosswalk detection device according to claim 1, wherein the main pattern comprises the first sub pattern and the second sub pattern that adjoins to a side of the first sub pattern.

9. The crosswalk detection device according to claim 8, wherein the main pattern further comprises the another second sub pattern that adjoins to another side of the first sub pattern.

10. The crosswalk detection device according to claim 1, wherein the determining unit determines whether or not the image of the crosswalk is present based on a regularity of an interval between peak values indicated by a characteristic curve derived from a process result by the computing unit.

11. The crosswalk detection device according to claim 1, wherein the determining unit determines whether or not the image of the crosswalk is present based on a regularity of an interval of peak values of a characteristic curve indicating a relationship between a position of the main pattern in a moving direction of the main pattern and a level of consistency that is a process result by the computing unit.

12. The crosswalk detection device according to claim 1, wherein a first straight line defined by the first position and the second position is orthogonal to a road appearing in the image.

13. The crosswalk detection device according to claim 12, wherein the calculating unit calculates, while further moving the main pattern along a second straight line parallel to the first straight line, a first calculated value calculated based on brightness of pixels overlapping the first sub pattern and a second calculated value calculated based on brightness of pixels overlapping the second sub pattern.

14. A crosswalk detection method comprising:
a calculating step for calculating, while moving a main pattern including a first sub pattern corresponding to white patterns of a crosswalk appearing in an image and a second sub pattern corresponding to a region between the white patterns from a first position on the image to a second position different from the first position, a first calculated value calculated based on brightness of pixels overlapping the first sub pattern and a second calculated value calculated based on brightness of pixels overlapping the second sub pattern;
a computing step for performing arithmetic processing using the first calculated value and the second calculated value; and
a determining step for determining whether or not an image of the crosswalk is present between the first position and the second position based on a regularity of a relationship between a position of the main pattern and a process result obtained based on the first calculated value and the second calculated value.

* * * * *